3,827,892
MICA BASED, CERAMIC COMPOSITE MATERIAL
James W. McCauley, Wakefield, Mass., assignor to the United States of America as represented by the Secretary of the Army
Filed May 7, 1973, Ser. No. 357,571
Int. Cl. B32b 5/16; C04b 33/26; F16k 31/12
U.S. Cl. 106—46
2 Claims

Fig I
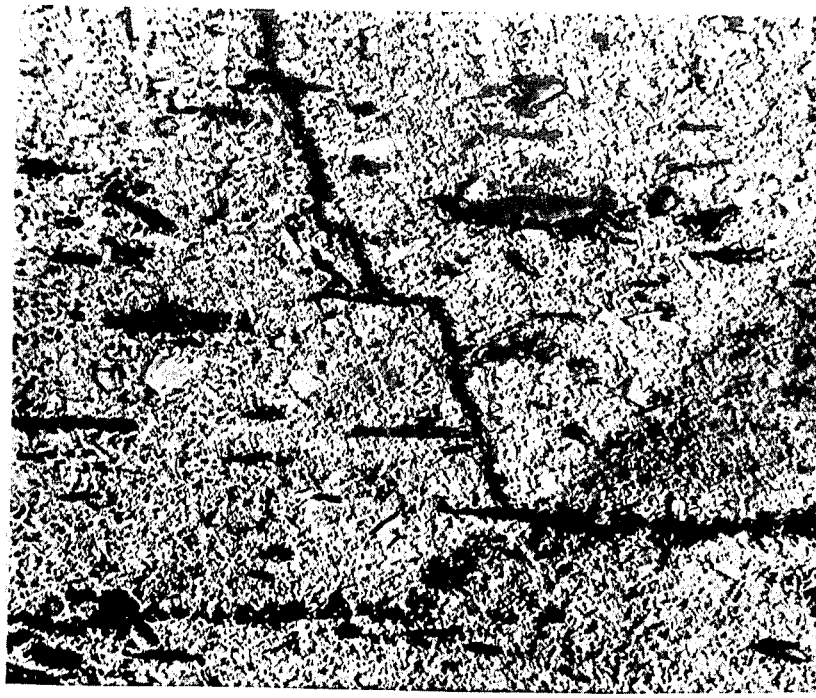
Fig II

ABSTRACT OF THE DISCLOSURE

The use of synthetic, fluorine containing micas, by hot-pressing as a second phase incorporation into a ceramic body in an amount of 5 to 50% by volume to produce a novel particulate dispersion or a dispersed micro-laminate thereby enhancing the properties of the ceramic materials.

---

The invention described herein may be manufactured, used and licensed by or for the Government for governmental purposes without the payment to me for royalty thereon.

This invention relates to hot-pressed fluorine micas/ceramic composites having improved properties.

BACKGROUND OF THE INVENTION

Most ceramic materials such as $Al_2O_3$, MgO, mullite, i.e., $3Al_2O_3 \cdot SiO_2$, $Si_3N_4$, $SiO_2$ etc., exhibit many desirable properties, e.g., light weight, high temperature stability, oxidation resistance, high strength, stiffness, etc. It has been found that the properties of these ceramic materials can be improved by the volume and the chemical composition of a fluorine containing mica material incorporated therein by hot-pressing.

SUMMARY OF THE INVENTION

The present invention relates to the incorporation of a fluorine containing mica by hot-pressing into a ceramic material in an amount of 5 to 50% by volume to produce a mica-ceramic composite. Illustrative fluorine containing micas include commercially available $KMg_3AlSi_3O_{10}F_2$ and $BaMg_3Al_2Si_2O_{10}F_2$. Other synthetic fluorine containing micas considered operable are disclosed by H. R. Shell and K. H. Ivey, Fluorine Micas, Bureau of Mines Bulletin 647 (1969). Illustrative ceramic material include commercially available $Al_2O_3$, MgO, $3Al_2O_3 \cdot SiO_2$, $Si_3N_4$, $SiO_2$, etc.

It is an object of the present invention to provide and disclose a novel mica-ceramic materials having controllable properties and microstructure.

It is a further object of the present invention to provide and disclose novel mica-ceramic composite materials having enhanced strength and toughness by the substantially reaction free incorporation of the mica phase.

It is a further object of the present invention to provide and disclose novel mica-ceramic composite materials having enhanced thermal shock resistance.

It is a further object of the present invention to provide and disclose novel mica-ceramic composite materials which are self-lubricating.

BRIEF DESCRIPTION OF THE DRAWINGS

Other objects and a fuller understanding of the invention may be ascertained by referring to the following description and claims taken in conjunction with the accompanying drawings in which:

FIG. 1 is a photomicrograph of an illustrative relief polished hot-pressed Ba-mica/$Al_2O_3$ composite material.

FIG. 2 is a photomicrograph of an illustrative relief polished, hot-pressed Ba-mica/$Al_2O_3$ composite material thermally shocked into room temperature water from 700° C.

DESCRIPTION OF PREFERRED EMBODIMENT

In a specific example, a mixture of 57.44 grams of $Al_2O_3$ (90% by volume) having an average grain size of about 0.5 to 1.0$\mu$; and 5.6 grams of $BaMg_3Al_2Si_2O_{10}F_2$ flakes (10% by volume) having an average flake size 30$\mu$ in length by about 5–10$\mu$ thick, were blended by tumbling the dry material in a glass container for a period of about 24 hours. After blending, the mixture is loaded into a graphite die and brought to a pressure of about 7,000 p.s.i. When the mixture is under full pressure, the graphite die and plunger assembly is inductively heated in air to 1250° C. The above pressure and temperatures are maintained for a period of about 1 hour and then terminated. When the temperature reaches 500° C., the pressure is fully released and the system allowed to cool to room temperature. A $BaMg_3Al_2Si_2O_{10}F_2/\alpha\text{-}Al_2O_3$ composite material 2" in diameter by about 0.25" thick, was recovered.

Both $BaMg_3Al_2Si_2O_{10}F_2$, and $KMg_3AlSi_3O_{10}F_2$ have been reactively hot-pressed with $\alpha\text{-}Al_2O_3$ and other ceramics. Experimentally determined densities ranged from 99.5% of theoretical for the 95% $Al_2O_3$ composite to 95.5 of theoretical for the 50% $Al_2O_3$ material. These data, together with microscopic examination and X-ray diffraction analysis shows that there is no reaction product formation for the higher $Al_2O_3$ composites, and not more than 1–2% for the lower $Al_2O_3$ compacts.

Normal $Al_2O_3$ is hot-pressed at temperatures of about 1800° C., whereas the present micas/$Al_2O_3$ composites can be fully sintered and densified at 1250° C., which is more than 500° C. lower than the normal processing conditions. This is possible because the micas release, e.g., a KF vapor phase throughout the compact which acts as a fluxing agent in the hot pressing process.

FIG. 1 is a photomicrograph of a representative Ba-mica/$Al_2O_3$ composite material fabricated in accordance with the present method. Coefficient of friction measurement on these materials indicate that the microstructure is also controllable since the measured frictional properties of Ba-mica/$Al_2O_3$ are 20–30% better than those of commercially available $Al_2O_3$.

FIG. 2 is a photomicrograph of a Ba-mica/$Al_2O_3$ material thermally shocked into room temperature from 700° C. Note that the mica flakes in the composite absorb crack propagation energy by changing the crack direction and by initiating new cracks.

Figure 5:
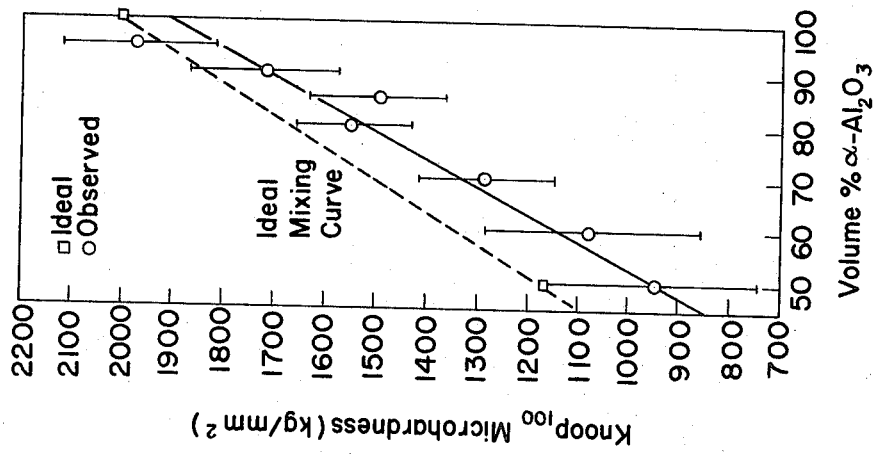
FIG. 5 is a graph illustrating values obtained from the evaluation of hot-pressed Ba-mica/$Al_2O_3$ composites for Young's Moduli.
Figure 4:
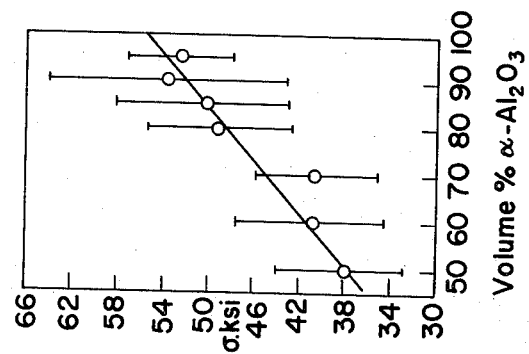
FIG. 4 is a graph illustrating values obtained from the evaluation of hot-pressed Ba-mica/$Al_2O_3$ composites for Four Point Flexure Strengths.
Figure 3:
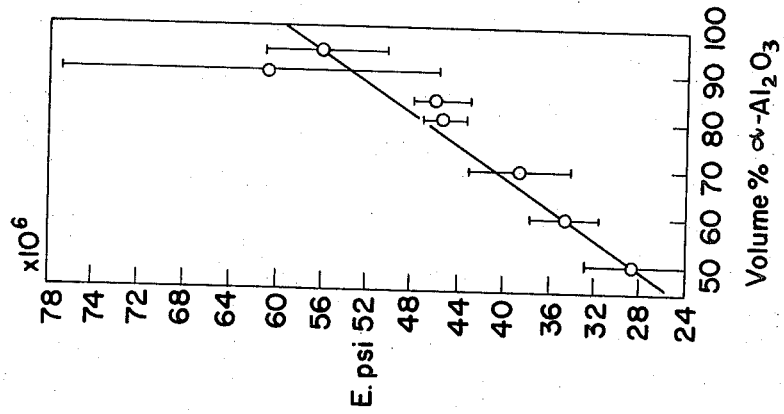
FIG. 3 is a graph illustrating average values obtained from the evaluation of hot-pressed Ba-mica/$Al_2O_3$ composties for mean Knoop (100) microhardness.

FIGS. 3, 4 and 5 indicate that the physical properties of the present composite, i.e., hardness, strength and stiffness, respectively, may be controlled by the amount of fluorine containing mica incorporated into the ceramic.

The average hardness values indicated on FIG. 1 represent an average machinability. Hence, the incorporation of micas into ceramics facilitates machining while enhancing its strength and toughness, thus decreasing machining cost and improving the possibilities of obtaining chip-free material. The utilization of chip-free materials enables the obtainment of more precise machining tolerances at the edges and corners of the materials. This is possible because the present mica/ceramic material due to its enhanced strength and toughness is less susceptible to brittle failure.

The unique and new idea involved in this invention of a new family of materials is the use of synthetic fluorine micas as a dispersed second phase incorporation in a ceramic body producing a particulate dispersion composite or a dispersed mico-laminate to:

(a) toughen ceramic material thereby enhancing strength,
(b) control mechanical, electrical, chemical properties, etc.,
(c) improve thermal shock resistance,
(d) implement self-lubrication enhancement.

Dielectric measurements have been made on the present composites. Measured perpendicular to the mica flake on a 30% Ba-mica/$Al_2O_3$ material, the dielectric constant at one mc. is 8.9 with a tangent loss of 0.0016. When measured parallel to the flakes, the values are 9.5 and 0.001, respectively.

In view of the properties of the present composite, it would have diverse uses, e.g., a dielectric substrate, bearing and seal materials, armor, cutting tools, etc.

Although I have described my invention with a certain degree of particularly, it is understood that the present disclosure has been made by way of example and that other operable ceramics and synthetic fluorine containing micas and methods of fabrication thereof will occur to a person of ordinary skill in the art.

Having described my invention, I claim:

1. A hot-pressed composition of matter consisting of a ceramic material having incorporated therein a fluorine containing mica component as a dispersed phase in an amount of 5 to 50% by volume, wherein the ceramic is selected from the group consisting of $Al_2O_3$, MgO, $3Al_2O_3 \cdot SiO_2$, $Si_3N_4$ and $SiO_2$, and wherein the mica is selected from the group consisting of $KMg_3AlSi_3O_{10}F_2$ and $BaMg_3Si_2O_{10}F_2$.

2. A hot-pressed composition of matter in accordance with claim 1, wherein the ceramic is $Al_2O_3$ and wherein the mica is $BaMg_3Al_2Si_2O_{10}F_2$.

References Cited

UNITED STATES PATENTS

| | | | |
|---|---|---|---|
| 3,789,096 | 1/1974 | Church et al. | 264—60 |
| 3,141,786 | 6/1961 | Bugosh | 106—73.1 X |
| 3,122,505 | 2/1964 | Rulon-Miller et al. | 252—12 |
| 3,291,622 | 12/1966 | Mandorf | 106—73.1 X |
| 2,897,573 | 8/1959 | Hessinger | 106—Dig. 003 |
| 2,859,794 | 11/1958 | Barr | 106—73.5 X |

OTHER REFERENCES

Rossi et al.: "Final Stage Densification in Vacuum Hot-Pressing of Alumina," J. Am. Cer. Soc., 48 (11), 1965, pp. 558-64.

Comeforo et al.: "Synthetic Mica Investigations: I Hot-Pressed Machinable Ceramic Dielectric," J. Am. Cer. Soc., 36 (9), 1953 (pp. 286-394).

HELEN M. McCARTHY, Primary Examiner

U.S. Cl. X.R.

51—308; 106—39.5, 73.1, 73.4, 73.5, Dig. 003; 161—171; 252—12; 264—65